United States Patent
Kontuniemi et al.

(10) Patent No.: US 11,767,046 B2
(45) Date of Patent: Sep. 26, 2023

(54) ROLL CONTAINER AND LOGISTICS SYSTEM COMPRISING THE SAME

(71) Applicant: K. Hartwall Oy Ab, Söderkulla (FI)

(72) Inventors: Janne Kontuniemi, Söderkulla (FI); Jack Grönholm, Söderkulla (FI); Jussi Raninen, Söderkulla (FI)

(73) Assignee: K. Hartwall Oy Ab, Soderkulla (FI)

( * ) Notice: Subject to any disclaimer, the term of this patent is extended or adjusted under 35 U.S.C. 154(b) by 84 days.

(21) Appl. No.: 17/352,038

(22) Filed: Jun. 18, 2021

(65) Prior Publication Data

US 2021/0394807 A1 Dec. 23, 2021

(30) Foreign Application Priority Data

Jun. 18, 2020 (FI) ...................................... 20205647

(51) Int. Cl.
*B62B 3/02* (2006.01)
*B62B 3/00* (2006.01)

(52) U.S. Cl.
CPC .............. *B62B 3/022* (2013.01); *B62B 3/025* (2013.01); *B62B 3/005* (2013.01); *B62B 2205/32* (2013.01)

(58) Field of Classification Search
CPC ......... B62B 3/022; B62B 3/025; B62B 3/005; B62B 3/002; B62B 3/02; B62B 2205/32; B62B 2205/30
See application file for complete search history.

(56) References Cited

U.S. PATENT DOCUMENTS

| | | | | |
|---|---|---|---|---|
| 3,698,733 A | * | 10/1972 | Isaacs | B62B 3/002 |
| | | | | 280/33.998 |
| 5,797,503 A | * | 8/1998 | Stevens | B62B 3/006 |
| | | | | 211/186 |
| 7,878,345 B2 | | 2/2011 | Tourlamain | |
| 7,886,673 B2 | | 2/2011 | Korte et al. | |
| 10,252,737 B2 | * | 4/2019 | Nowe | A01G 9/143 |
| 10,538,261 B2 | | 1/2020 | Nowe | |

(Continued)

FOREIGN PATENT DOCUMENTS

| | | |
|---|---|---|
| DE | 2800575 A1 | 7/1978 |
| DE | 10062425 A1 | 6/2002 |

(Continued)

OTHER PUBLICATIONS

Australia Examination Report Re: Application No. 2021203657 dated Aug. 24, 2021.

*Primary Examiner* — John D Walters
(74) *Attorney, Agent, or Firm* — Chernoff, Vilhauer, McClung & Stenzel, LLP

(57) ABSTRACT

A novel logistics system is disclosed involving a roll container (100) with a base (110) and two elongated supports (120) that are supported by the base (110). The supports each have a plurality of individual slots (122) provided in a spaced apart configuration along the supports (120) for receiving a tab (133, 134) of a respective plurality of shelves (130) in a spaced apart configuration. The roll container may further include a folding mechanism between the base and the supports for turning the supports between an operational state and a folded state. In the operational state of the roll container the supports extend transversally in respect to the base. In the folded state of the roll container the supports extend parallel to the base.

20 Claims, 9 Drawing Sheets

(56) References Cited

U.S. PATENT DOCUMENTS

| 11,034,370 | B2* | 6/2021 | Cao | B62B 3/022 |
| 2017/0197647 | A1* | 7/2017 | Bouma | B62B 3/006 |

FOREIGN PATENT DOCUMENTS

| EP | 3141453 | A1 | 3/2017 |
| FR | 2521425 | | 2/1982 |
| JP | 2005-245672 | A | 9/2005 |
| KR | 20060033890 | A | 4/2006 |
| RU | 2370021 | C2 | 10/2009 |

* cited by examiner

ROLL CONTAINER AND LOGISTICS SYSTEM COMPRISING THE SAME

FIELD

The present disclosure relates to load carriers used in logistics. In particular, the present disclosure relates to manually operated wheeled containers with removable and adjustable shelves. Examples of such containers are used retail business.

BACKGROUND

Shelved roll containers are widely used in retail business to carry and store goods for storage and merchandising purposes. Roll containers have been tailored to meet the requirements of particular applications. Let us take florists as an example. A roll container tailored to transport and store flowers is preferably one that is not overly deep so as to fit into narrow corridors typically found in florist shops. In addition, the shelves should preferably permit the passage of any spillages of water but retain spillages of soil. Accordingly, typical meshed roll containers with a square foot-print are not ideal for such an application.

An exemplary roll container specially modified for florist use is disclosed in JP 3568015 B2 involving shelves that can be tilted for a convenient presentation of the goods. The shelves of several roll containers may be positioned into receptive individual holes of one roll container for return logistics, wherein the other roll containers are disassembled for more to gain volumetric efficiency.

There is, however, an ever-present need to improve the usability of shelved roll containers or at least provide the public with a useful alternative.

SUMMARY OF THE INVENTION

According to a first aspect of the present disclosure, there is provided a roll container with a base and two elongated supports that are supported by the base. The supports each have a plurality of individual slots provided in a spaced apart configuration along the supports for receiving a tab of a respective plurality of shelves) in a spaced apart configuration. The roll container further includes a folding mechanism between the base and the supports for turning the supports between an operational state and a folded state. In the operational state of the roll container the supports extend transversally in respect to the base. In the folded state of the roll container the supports extend parallel to the base.

According to a second aspect of the present disclosure, there is provided a logistics system with such a roll container and at least one shelf at least one shelf having a quadrilateral and a pair of short tabs provided to two opposing corners of the frame. The short tabs exhibit a kinked shape and a length along respective longitudinal sides of the frame. The shelf also has a pair of long tabs provided to two opposing corners of the frame that oppose the pair of short tabs. The long tabs exhibit a kinked shape and a length along respective longitudinal sides of the frame that is greater than the length of the short tabs.

Various embodiments of the first aspect may comprise at least one feature from the following itemized list:
 the supports also have at least one elongated stacking slot for receiving a plurality of tabs of a respective plurality of shelves in a stacked configuration;
 the base has a quadrilateral shape and comprises uprights provided to opposing lateral edges of the base;
 the base has a quadrangular shape and comprises uprights provided to the corners of the base;
 the folding mechanism is provided between the uprights and the supports;
 the folding mechanism comprises an elongated guide provided to the uprights an a hinge pin which is provided to the supports and configured to run in the guide of the upright;
 the folding mechanism is configured to allow respective translation and rotation between the support and base during conversion between the operational and folded state;
 the roll container comprises casters provided on an underside of the base;
 the uprights extend from the topside of the base at a height which is equal to or greater than the height of the casters;
 the base comprises carrier beams extending along lateral sides of and elevated from the topside of the base;
 the supports comprise cooperating counterpart beams which are configured to rest against the carrier beams of the base in the operational state of the roll container;
 at least one carrier beam comprises at least one strut which is configured to extend from the beam carrier and engage with the counterpart beam for maintaining the orientation of the support in the operational state;
 individual slots are each configured to accept only one tab at a time;
 the plurality of slots comprises at least two types of slots arranged alternately along the support;
 the at least two types have a different shape in respect to one another for helping the user choose the correct height for the shelf;
 the individual slots and the at least one stacking slot are provided on opposing sides of the roll container;
 the tabs comprise a proximal portion, which extends away from the respective longitudinal side of the frame;
 the tabs comprise a distal portion, which extends from the proximal portion along the respective longitudinal side of the frame;
 tab includes a claw at the tip;
 the logistics system comprises a plurality of such shelves;
 the tabs of the at least one shelf may be installed into receptive individual slots in an operational configuration of the logistics system and into receptive stacking slots in a return configuration of the logistics system;
 the roll container has been provided with a plurality of such shelves loaded in a stacked configuration into the at least one stacking slot,
 the length of the tab is defined between the distance between the tip and transition between the proximal portion and the distal portion.

Considerable benefits are gained with aid of the novel proposition. Because the supports may be folded down against the base of the roll container, no disassembly is required for return logistics.

According to one embodiment, the supports also have at least one elongated stacking slot for receiving a plurality of tabs of a respective plurality of shelves in a stacked configuration. The embodiment has the further benefit of facilitating easy stacking of the shelves for return logistics thus improving useability.

BRIEF DESCRIPTION OF THE DRAWINGS

In the following certain exemplary embodiments are described with reference to the accompanying drawings, in which:

FIG. 9b presents a perspective view of the stacking of the roll containers of FIG. 9a.

EMBODIMENTS

In the present context the expression corner includes but is not limited to the quarter of a quadrilateral object which includes the connection point between two sides of the object.

In the present context the expression kinked shape includes but is not limited to a shape which includes a first portion, which extends in a direction, which has a dominant component in a first Cartesian dimension, a second portion, which extends in another direction, which has a dominant component in a second Cartesian dimension, and a transition between the first portion and a second portion. Examples of kinked shapes include straight angles with sharp, chamfered or round transitions, e.g. shapes resembling letters L or V.

Figure 1:
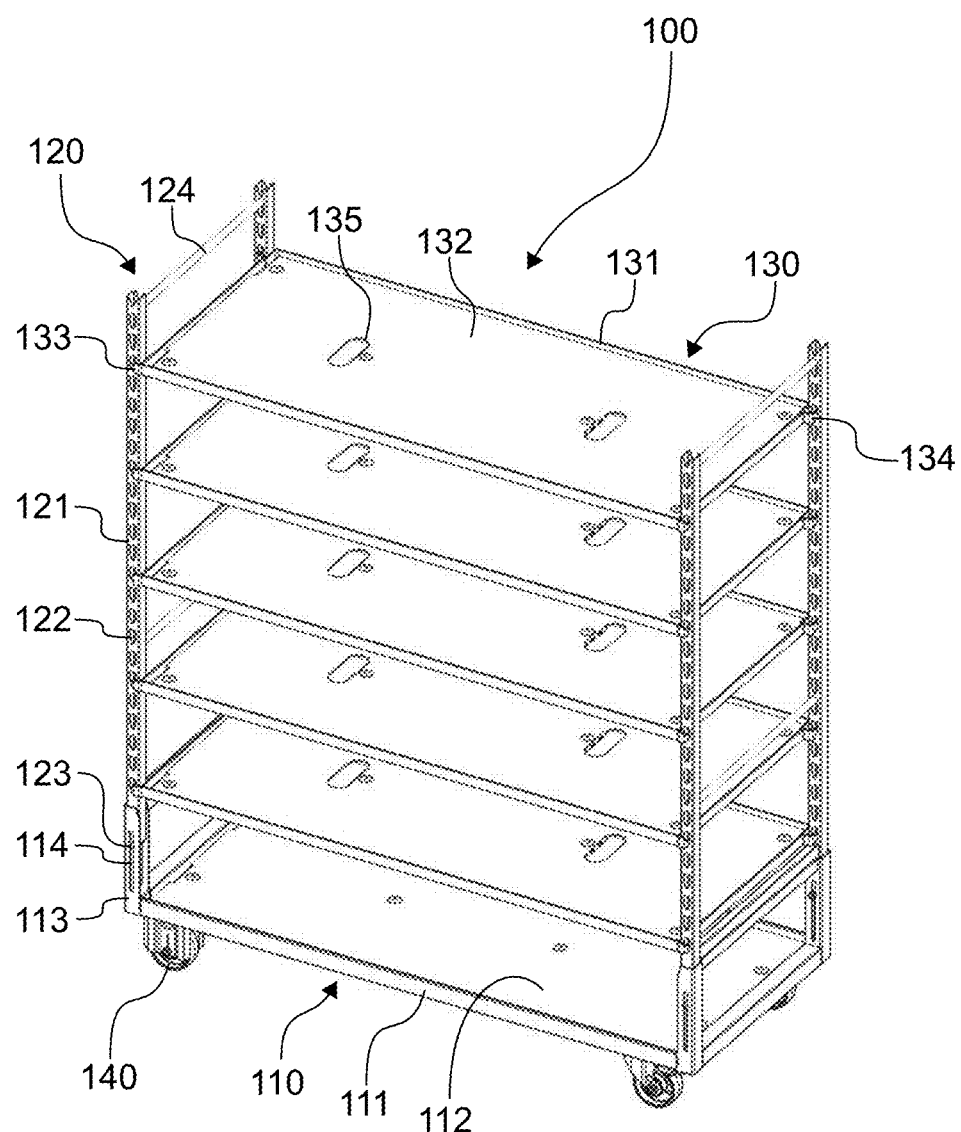
FIG. 1 presents a perspective view of a logistics system according to one embodiment involving a roll container in an operational state provided with five shelves.

FIG. 1 illustrates a logistics system in accordance with at least some embodiments of the present invention featuring a roll container 100 loaded with five shelves 130. The roll container 100 has a base 110 that is equipped with casters 140 and uprights 113. The base 110 has a generally quadrilateral, particularly quadrangular, shape. The example shown in FIG. 1 features two mutually opposing and relatively short longitudinal sides and two mutually opposing and relatively long transversal sides. The idea of such an elongated rectangular shape is to provide for a container that is relatively wide and shallow for merchandising goods, such as flowers, in small commercial spaces. In the present context the longitudinal side extends in the direction in which the shelves 130 are put in and taken out of the roll container 100. Conversely, the customer or other user of the logistics system is intended to be presented with the transversal side. Flowers and other goods are mainly loaded from the long side, but can also be loaded from the short side.

The base 110 has a frame 111 which defines the shape of the base 110 and which delimits a cover 112. The cover 112 may be a simple plate made of plywood, cellular board, etc. The construction of the frame 111 may be based on a tubular frame with a mesh infill. On top of mesh a thin plastic sheet may be added and riveted to the mesh. The cover 112 preferably includes drainage holes. The castors 140 may include fixed, i.e. non-steering, or swivel wheels or a mixture thereof as shown in FIG. 1. The fixed castors 140 are preferably oriented to wheel the roll container 100 in a direction that is parallel to the transversal side, i.e. the long side.

Figure 2:
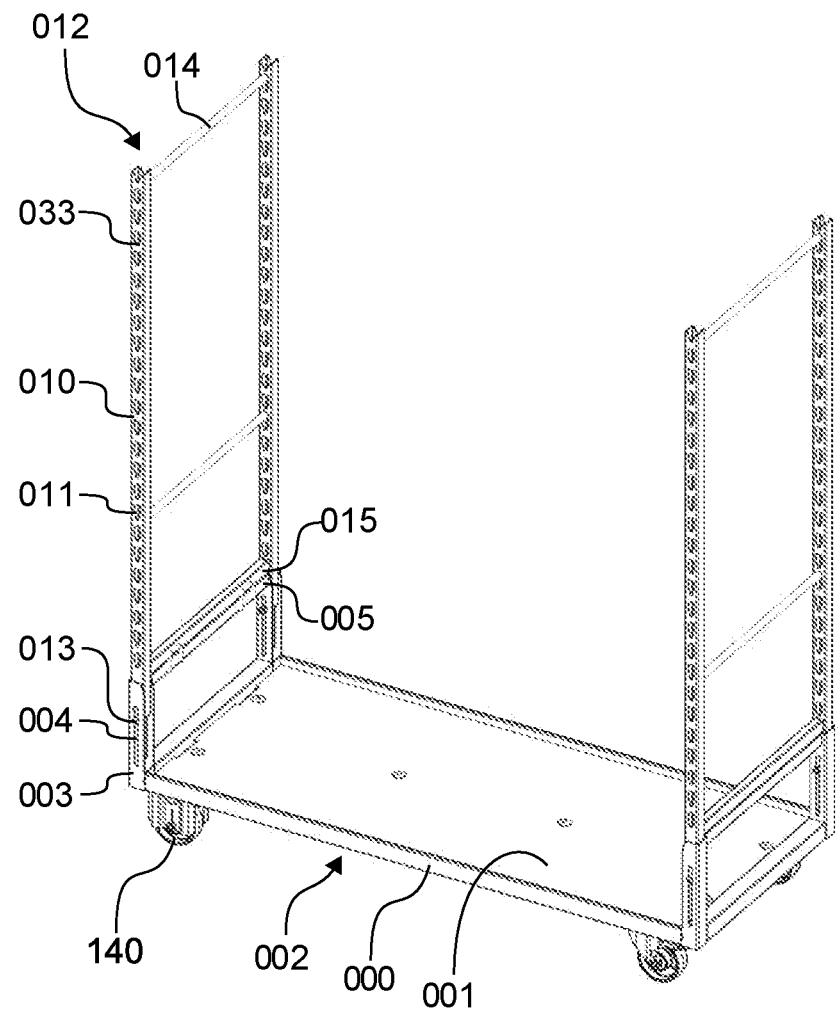
FIG. 2 presents a perspective view of the roll container of FIG. 1 without shelves.

FIG. 2 illustrates the construction of the roll container 100 in greater detail. The uprights 113 include two pairs of profiles arranged at opposing ends of the base 110 in respect to the transversal sides. In other words the base 110 has four corner columns. The uprights 113 extend perpendicularly in respect to the base 110. In a general operational state the base 110 may be seen as extending horizontally and the uprights 113 vertically. The uprights 113 include an elongated profile. In the illustrated example the profile has an open side thus resembling the letter C in cross-section. The open side faces the cargo space of the roll container 100 that is defined by the base 110 and the uprights 113. The uprights 113 also include guides 114 which, according to the illustrated embodiment, take the form of an elongated groove. The groove pierces through the profile in a direction which is parallel to the longitudinal sides. Connecting both pairs of adjacent uprights 113 is a carrier beam 115 which also extends along the respective longitudinal side.

The carrier beam 115 serves the purpose of bearing the weight of shelves 130 through two elongated supports 120. The carrier beams 115 are preferably provided with struts 116 for positioning and propping the supports. The supports 120 are, in other words, supported by the base 110 through the uprights 113. Similar to the uprights 113, the supports 120 are feature a pair of standards 121 that are joined by connecting elements, such as rungs 124 and/or a beam 125. The beam 125 is constructed as a counterpart beam to the carrier beam 115 of the uprights 113, wherein the carrier beam 115 carries the counterpart beam 125 of the supports 120. The supports 120 are constructed as foldable racks for the shelves 130. To facilitate supporting the shelves 130 the standards 121 are each made up by a profile equipped with individual slots 122 that are provided in a spaced apart configuration along the standards 121. The slots 122 are provided on a side of the standard 121 that faces transversal side of the roll container. Accordingly the shelves 130 may be installed a direction, in which is the longitudinal side extends. In the exemplary embodiment of FIG. 2 the standards 121 include 23 slots 122 to provide for 23 arbitrary shelf positions at respective 23 heights. As can be seen from the FIGURES, the plurality of slots 122 features two types of slots that are arranged alternately along the support 120. The purpose of the alternating shapes is to help the user to choose the correct height for the shelf 130. The profile of the standard 121 may be quadrangular, as depicted in the FIGURES, or any suitable cross-sectional shape.

Figure 4:
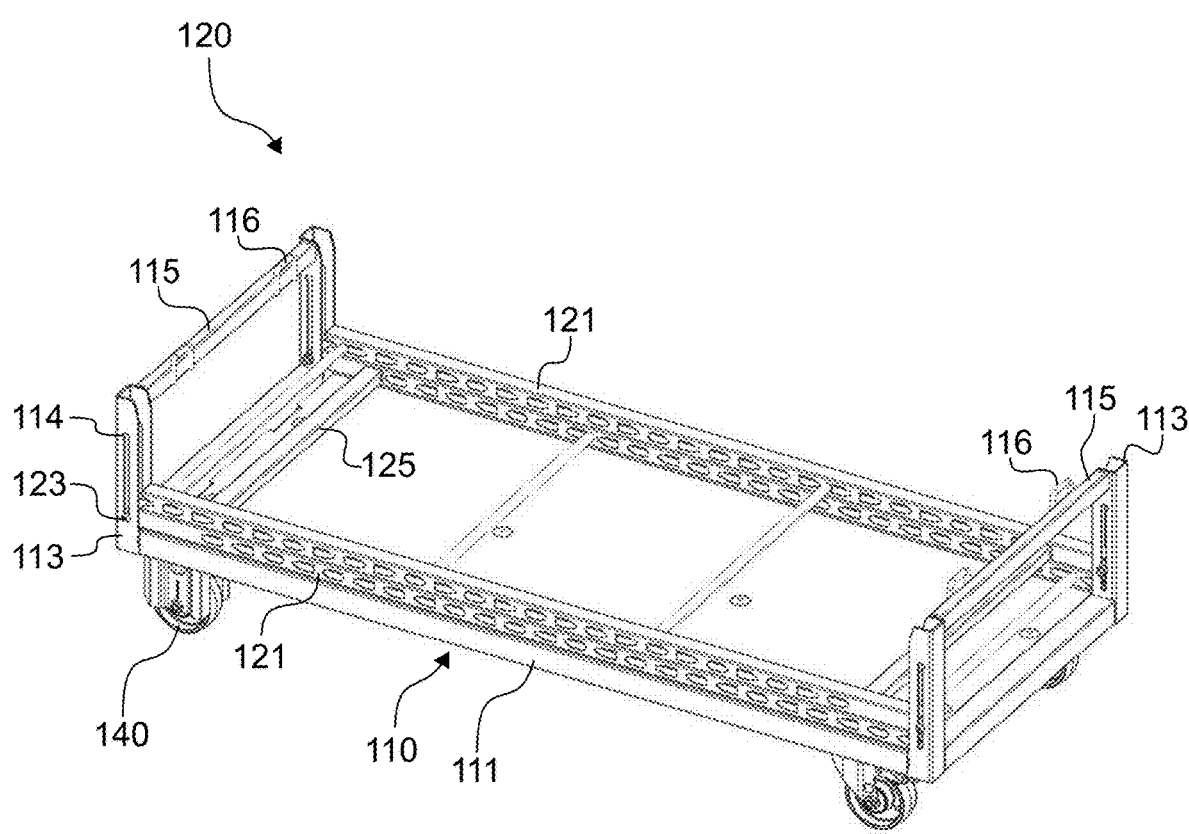
FIG. 4 presents a perspective view of the roll container of FIG. 2 in a folded state.

The supports 120 are designed to cooperate with the uprights 113 to facilitate folding of the supports 120 between an operational state, which is shown in FIG. 2, and a folded state, which is shown in FIG. 4. The proximal ends of the standards 121 are inserted into the receptive profiles of the uprights 113. The proximal ends of the standards 121 include a hinge pin 123 which runs in the guide 114 of the uprights 113. As can be seen from FIG. 2, the guide 114 is elongated so as allow for the support 120 to be translated in respect to the base 110. In the operational state the supports 120 are maintained in the upright position by the relatively narrow guide 114, which does not allow translation in a lateral direction, and on the other hand by the matching mating surfaces between the carrier beam 115 and the counterpart beam 125.

Figure 3:
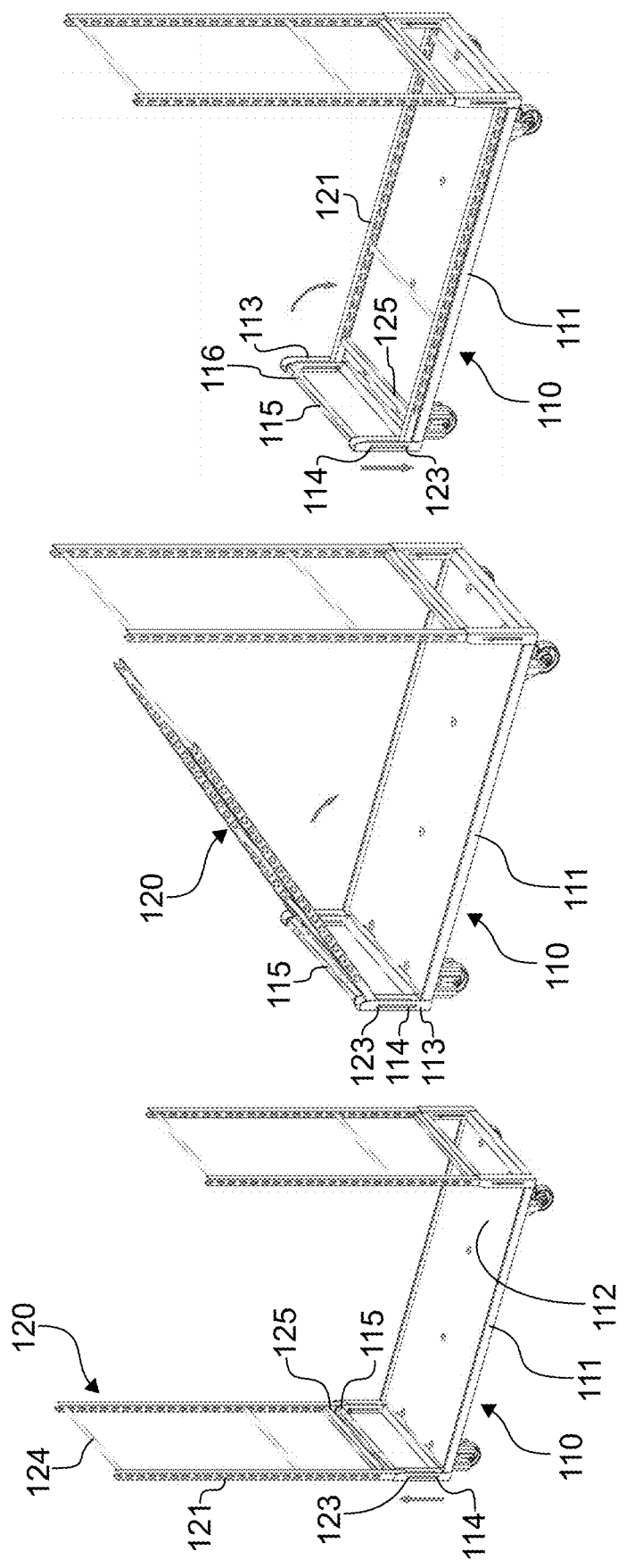
FIG. 3a presents a perspective view of the roll container of FIG. 2 in a first phase of a folding sequence.
FIG. 3b presents a perspective view of the roll container of FIG. 2 in a second phase of a folding sequence.
FIG. 3c presents a perspective view of the roll container of FIG. 2 in a third phase of a folding sequence.

FIGS. 3*a* to 3*b* show the folding sequence in greater detail. First the support 120 is elevated in respect to the base 110 along the guide 114 (see arrow in FIG. 3*a*). The movement is dictated by the passage of the hinge pin 123 in the guide 114. With the counterpart beam 125 of the support 120 detached from the carrier beam 115 of the supports 113 past the struts 116, the support 120 is free to be pivoted about the hinge provided by the hinge pin 125 and the guide 114. For this purpose the end of the guide 114 may include an offset recess to maintain the translational position of the hinge pin 125 during rotation. The open side of the profile of the uprights 113 permits rotation of the support 120 in respect to the base 110 (see arrow in FIG. 3*b*). During or after rotation the support 120 is lowered against the base 110 (see arrows in FIG. 3*c*). The same process is repeated for the opposing support 120 to assume the folded state (see FIG. 4. FIG. 4 also shows the construction of the struts 116 more clearly. The struts 116 may simply take the form of protrusions extending from the carrier beam 115 to provide lateral support and positioning aid for the supports 120. The struts 116 should be short enough to be cleared by lifting the support 120.

Figure 5A:
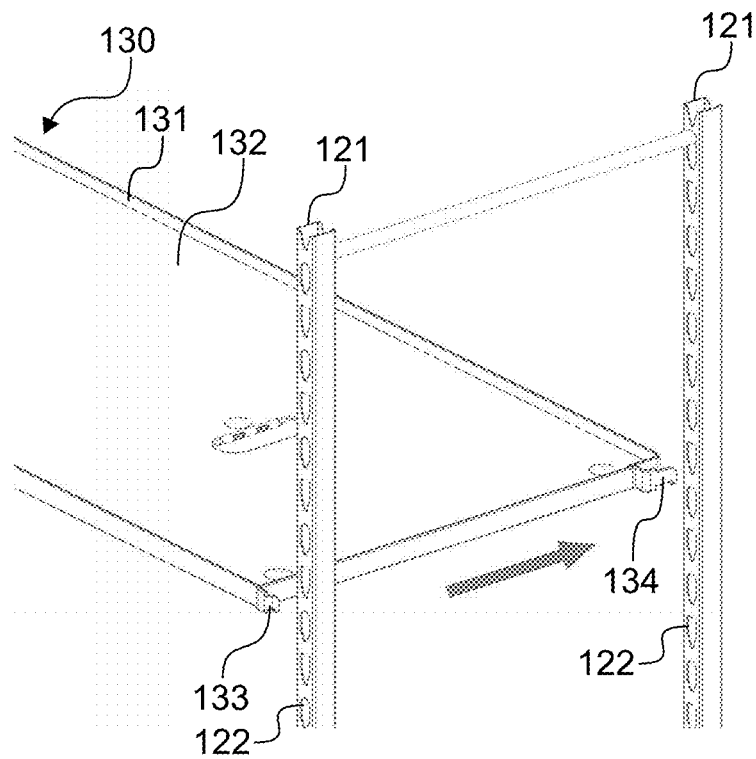
FIG. 5a presents a perspective view a shelf being installed into the roll container of FIG. 2.
Figure 5B:
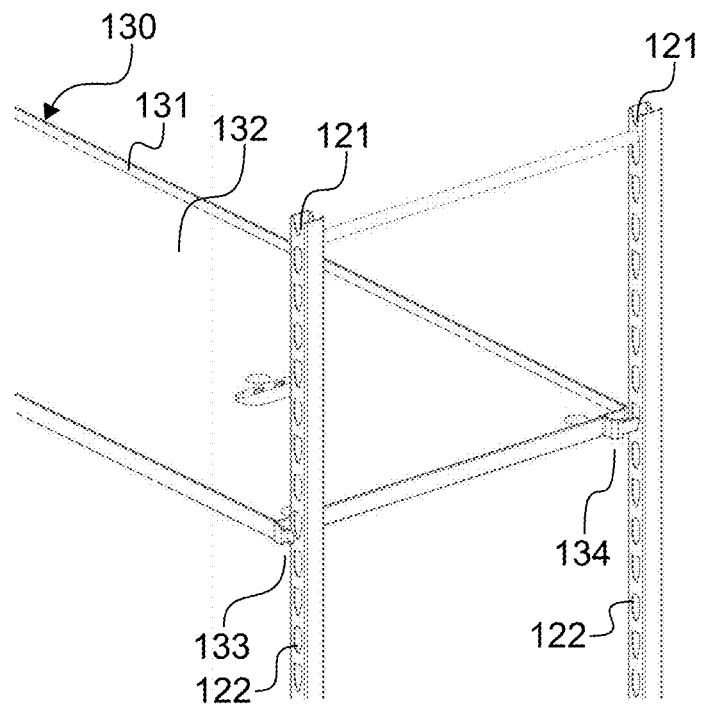
FIG. 5b presents a perspective view of the installation of FIG. 5a in an advanced phase.

FIGS. 5*a* and 5*b* show the installation sequence of the shelves 130 and the details thereof. The shelves 130 are generally planar pieces that are suspended by the supports 120 from opposing ends of the roll container 100. The supports 120 act as racks with openings 122 for receiving the corresponding tabs 133, 134 of the shelf 130 to a desirable height and orientation. FIG. 5*a* shows the insertion of an exemplary shelf 130 to the support 120. The shelf 130 features a generally quadrilateral frame 131 which delimits a cover 132. The frame 131 may be made of a metal profiles cut from a sheet and joined together into a periphery. The cover 132 may include a plywood, cellular board, cardboard, plastic sheet, etc. The frame 131 may exceed the cover 132 to provide for a peripheral lip.

The corners of the shelf 130 are provided with tabs 133, 134 for engaging the support 120. The tabs 133, 134 need not be placed at the extreme tips of the corners of the shelf 130 but positioning in the near vicinity of the tip is advised for the sake of volumetric efficiency. FIG. 5*a* shows that the tabs 133, 134 include a kinked shape in that the tab has two portions in an angled orientation with respect to one another. Firstly, the tab 133, 134 has a proximal portion, which extends away from the respective longitudinal side of the frame 131. The proximal portion may extend in a right angle in respect to the longitudinal side of the frame 131. The distal portion which extends from the proximal portion along the respective longitudinal side of the frame 131. The distal portion may therefore extend in a right angle in respect to the proximal portion. There is a transition between the portions, which may be a sharp angle, as shown in the FIGURES, or a relieved transition, such as a chamfered or a rounded transition. The tip of the tab 133, 134 includes a claw which is a further kink in the shape. The claw may be angled in respect to a dimension which is different to that in respect which the proximal and distal portions are angled in respect to each other. In a practical example the claw may extend downward to provide for a stopper for the shelf 130 preventing accidental withdrawal from the support 120.

The shelf 130 is made asymmetric in that the tabs 133, 134 may have different lengths and be positioned differently from each other. Let us first consider the leading end of the shelf 130 which is shown on the right hand side in FIGS. 5*a* and 6*b*. In this context the expressions leading and trailing refer to the transversal ends of the shelf which either lead or follow the insertion of the shelf into the roll container. The leading end has a pair of tabs 134 which are referred to as the long tabs. The proximal portions of the long tabs 134 are offset from the leading end. The distal portion of the long tabs 134 are relatively long in comparison with the tabs 133 which are provided in the trailing end. The tabs 133 provided to the trailing end of the shelf 130 are referred to as short tabs 133. The proximal portions of the short tabs 133 extend from the trailing end. While the proximal portions of the tabs 133, 134 may have an equal length, the length of the distal portion of the short tab 133 is smaller than that of the long tab 134. During insertion of the tabs 133, 134 into the receptive openings 122 on the support 120, the claws of the tabs 133, 134 protrude through the openings 122 to the inside of the profile of the support 120. The length of the tab 133, 134 is defined between the distance between the tip of the tab and the transition between the proximal portion and the distal portion.

Figure 6A:
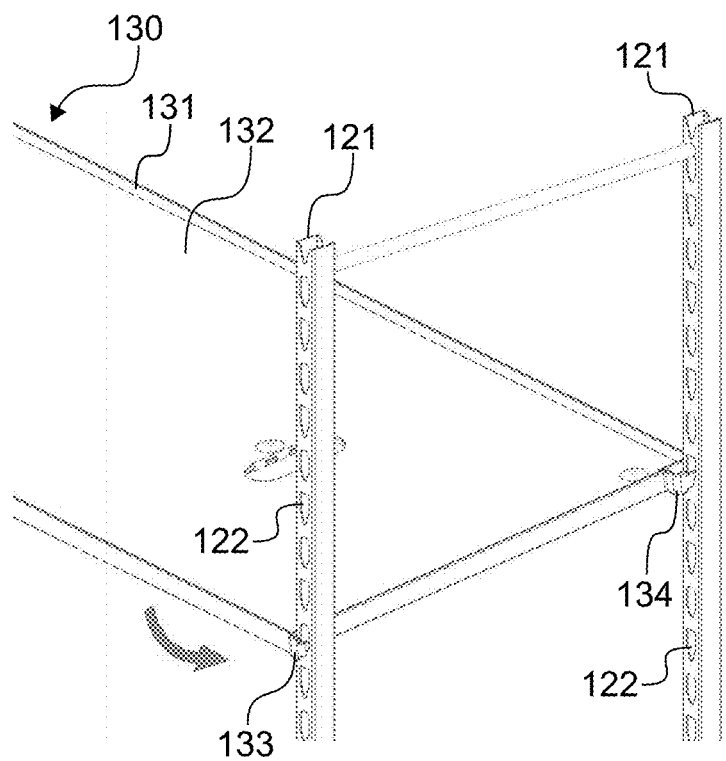
FIG. 6a presents a perspective view a shelf installed into a slightly tilted orientation in the roll container of FIG. 2.
Figure 6B:
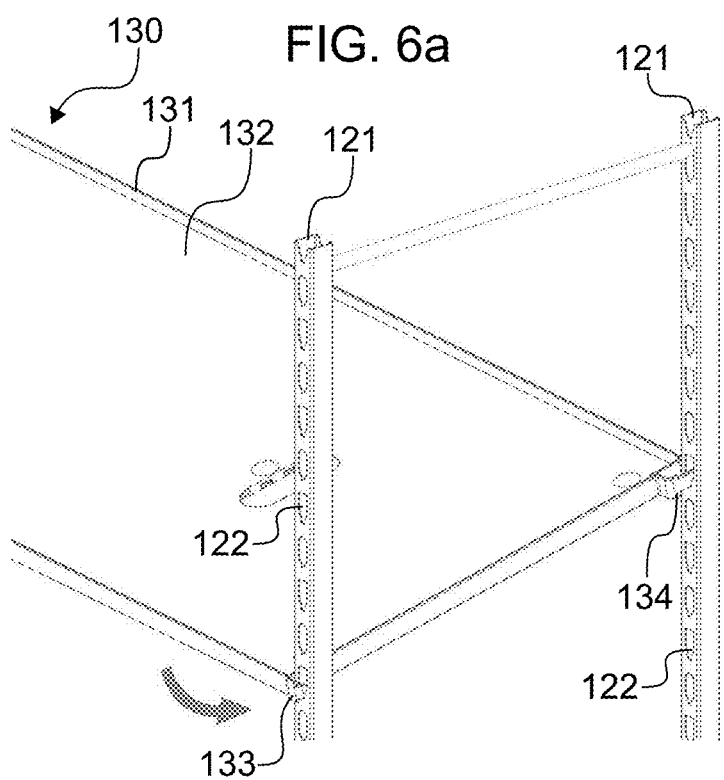
FIG. 6b presents a perspective view a shelf installed into a more tilted orientation in the roll container of FIG. 2.

The difference in tab lengths facilitates adjustment of shelf angle. FIG. 6*b* shows the shelf 130 in a horizontal orientation. By lifting and pulling the trailing end out to release the short tabs 133 from the openings 122, the shelf 130 may be tilted up or down. The tilting is enabled by the relatively long tabs 134 at the leading end that do not become detached from the support 120 even though the trailing end has been released from the respective support 120. FIG. 6*a* shows the shelf 130 angled down by one opening increment for a slight incline, whereas FIG. 6*b* shows the shelf 130 angled down by two opening increments for a larger incline. The asymmetric tabs 133, 134 also provided for added convenience in that all four tabs need not be inserted at once. Instead, the long tabs 134 may be inserted first, whereby the user can focus entirely on aligning the short tabs 133 to finish installation.

Figure 7:
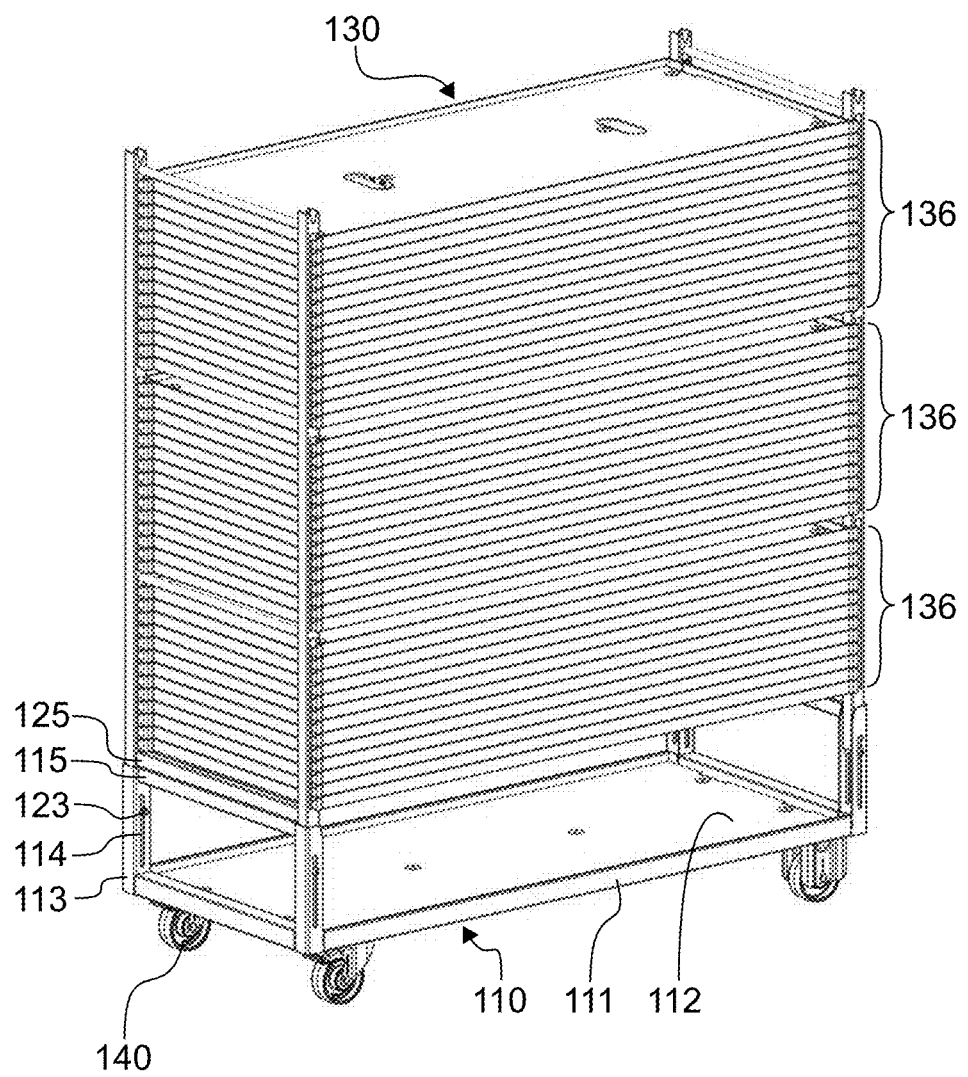
FIG. 7 presents a perspective view of the roll container of FIG. 2 in a fully loaded return state.

Let us next turn to the return configuration of the logistics system shown in FIGS. 7 to 9*b*. FIG. 7 shows the roll container 7 loaded with 43 shelves 130 in a return configuration. The shelves are arranged in three stacks 136 that are loaded into the roll container 120 on an opposing side compared to the operational loading shown in FIGS. 1 and 5*a* to 6*b*. The side of the roll container, toward which the individual openings face, is referred to as the operational configuration side. FIGS. 8*a* to 9*b* offer a more detailed representation of the opposing return configuration side.

Figure 8A:
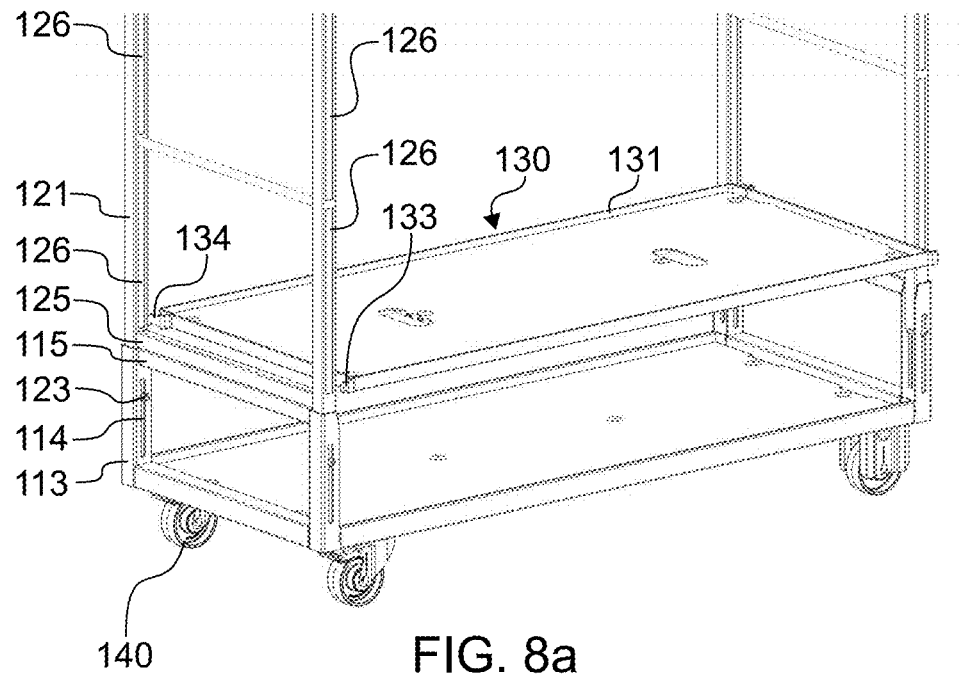
FIG. 8a presents a perspective view of the roll container of FIG. 2 in a first phase of a loading sequence into the fully loaded return configuration.
Figure 8B:
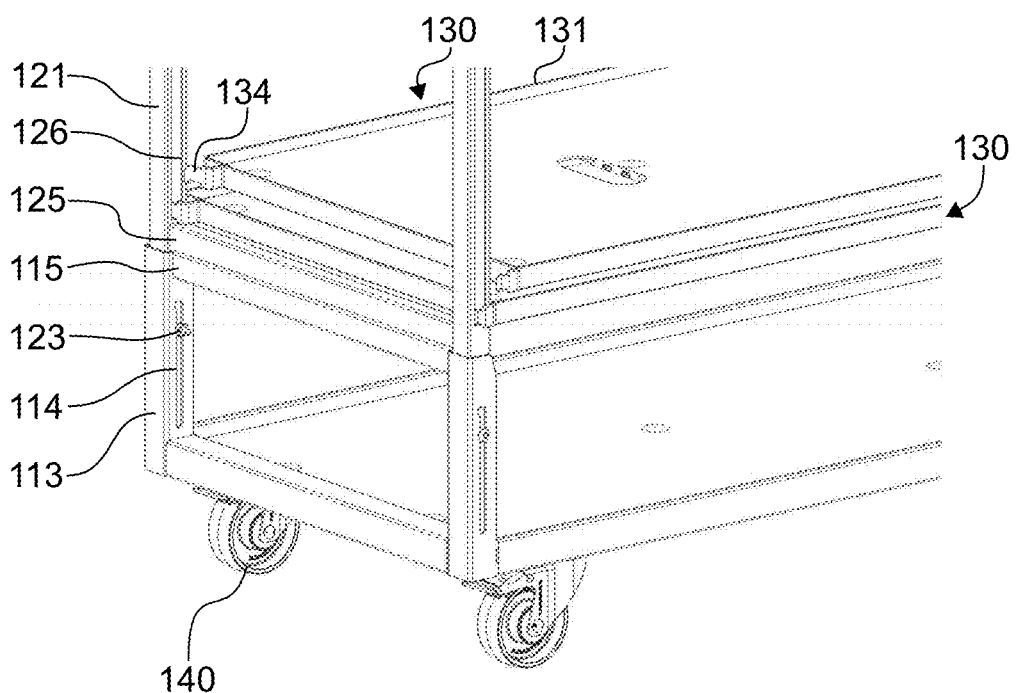
FIG. 8b presents a perspective view of the roll container of FIG. 2 in a second phase of a loading sequence into the fully loaded return configuration.

FIG. 8*a* shows the return configuration side of the roll container 100 being loaded with a shelf 130. As may be seen, the side of the supports 120 opposing the individual slots 122 has a stacking slot 126 for receiving several tabs of several shelves 130 is a stacked configuration. The stacking slots 126 are elongated along the supports 120 to facilitate such a plurality. The exemplary embodiment shown in the FIGURES includes several such stacking slots 126 on top each other divided by a neck portion of the profile of the support. Accordingly the exemplary roll container 100 may receive three stacks 136 of shelves 130. FIG. 8*a* shows the first shelf 130 of the bottom stack 136 being inserted into the stacking slots 126. The insertion into a stacking slot 126 is handled similarly to insertion into an individual slot 122 in that the claw is first introduced into the opening 122, 126 and then dropped until the tab 133, 134 makes contact with the profile of the support 120. FIG. 8*b* shows the first shelf having assumed the return state on the base 110 with the second shelf 130 of the stack 136 during insertion into the stacking slot 126.

Figure 9A:
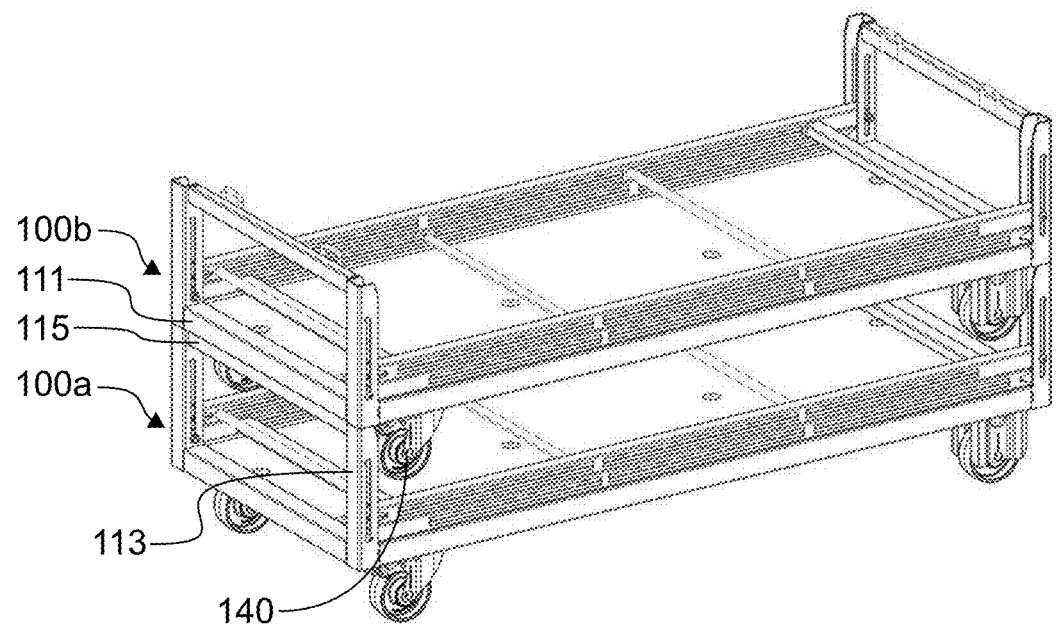
FIG. 9a presents a perspective view of two roll container of FIG. 4 in a stacked return configuration.
Figure 9B:
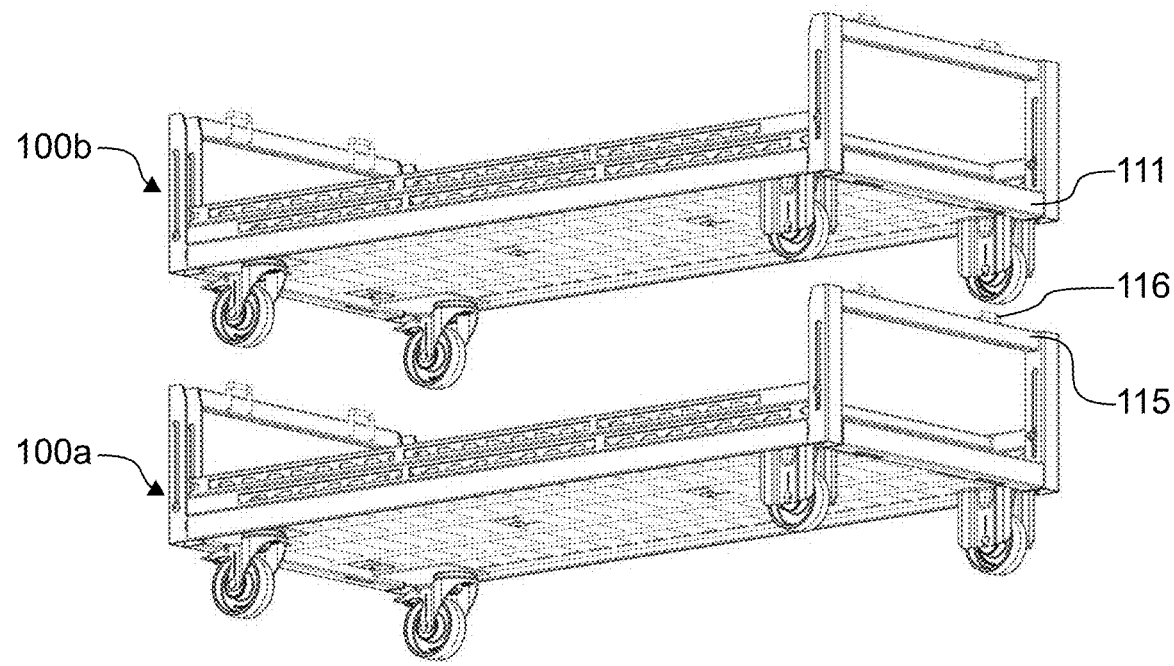

The stacking slots 126 serve the purpose of using one roll container 100 to return the shelves of several other roll containers back upstream in the supply network or during storage. The other roll containers 100 that do not include shelves may be returned in a stacked configuration as well. FIG. 9a shows two roll containers 100 in a folded state (as shown in FIG. 4) in a stacked formation. In the stacked formation the frame 111 of the base 110 of the superposed roll container 100 is carried by the carrier beam 115 of the roll container 100 below. The uprights 113 of the superposed roll container 100, on the other hand, are supported by the uprights 113 of the roll container 100 below. As the uprights 113 have a height greater than that of the caster 140, the casters 140 may fit into the space between the bases 110 of the stacked roll containers 100. FIG. 9b shows the stacking phase of these folded roll containers 100. It can be seen that the struts 116 of the roll container below guide and support the frame 111 of the superposed roll container 100 so as to align the containers in respect to each other.

The illustrated embodiments are described above as mere examples of how to embody aspects of the invention. Several variants are foreseeable. The construction could be varied, for example, by including several pairs of uprights and thus more than two supports. One could imagine a roll container with three supports for facilitating two columns of shelves either in an operational or return configuration. More than three such supports and columns of shelves are also foreseeable.

The logistics system may also be used by having a first set of shelves in an operational configuration loaded on the operational configuration side spaced apart from each other for merchandising purposes. A second set of shelves could be kept as reserve shelves underneath or on top of the load carrying shelves by loading them to the same roll container from the return configuration side. Alternatively, the supports could include individual slots and at least one stacking slot on the same side.

One can also imagine constructing a roll container with detachable supports instead of folding supports. Alternatively or additionally the base of the roll container may have a square shape instead of the illustrated elongated rectangular shape.

A further foreseeable aspect of the present disclosure involves a roll container roll container which comprises a base 110 and two elongated supports 120. The supports are supported by the base 110 and which each comprise a plurality of individual slots 122 which are provided in a spaced apart configuration along the supports 120. Each one of the plurality of individual slots 112 is configured to receive a tab 133, 134 of a respective plurality of shelves 130 in a spaced apart configuration. The supports 120 each comprise at least one elongated stacking slot 126, wherein the at least one stacking slot 126 is configured to receive a plurality of tabs 133, 134 of a respective plurality of shelves 130 in a stacked configuration. In such a foreseeable aspect the folding mechanism between the base 110 and the supports 120 is optional. If the folding mechanism is omitted, the supports may be attached to the base 110 through a simple shape coupling, such as a post with a female shape for receiving the support. The post may be embedded or proud in respect to the base. The aspect may include one or more features from the embodiments described above. Such an aspect would be particularly useful in constructing a roll container with a relatively compact base which may not accommodate the supports in a folded state.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

| REFERENCE SIGNS LIST | |
| --- | --- |
| No. | Feature |
| 100 | roll container |
| 110 | base |
| 111 | frame |
| 112 | cover |
| 113 | upright |
| 114 | guide |
| 115 | beam |
| 116 | strut |
| 120 | support |
| 121 | standard |
| 122 | individual slot |
| 123 | hinge pin |
| 124 | rung |
| 125 | counterpart beam |
| 126 | stacking slot |
| 130 | shelf |
| 131 | frame |
| 132 | cover |
| 133 | short tab |
| 134 | long tab |
| 135 | opening |
| 136 | stack |
| 140 | caster |

The invention claimed is:

1. A logistics system comprising:
a roll container having a base, two elongated supports supported by the base, and a folding mechanism between the base and the supports, the folding mechanism for turning the supports between an operational state in which the supports extend transversally in respect to the base, and a folded state in which the supports extend parallel to the base; and
at least one shelf having a quadrilateral frame, and comprising:
a pair of short tabs provided to two opposing corners of the frame, wherein the short tabs exhibit a kinked shape and a length along respective longitudinal sides of the frame; and
a pair of long tabs provided to two opposing corners of the frame that oppose the pair of short tabs and that extend in the same direction as the pair of short tabs, wherein the long tabs exhibit a kinked shape and a length along respective longitudinal sides of the frame that is greater than the length of the short tabs; where
each of the two elongated supports comprises a plurality of individual slots provided in a spaced apart configuration along the supports, and each of the plurality of individual slots is configured to receive a tab of said at least one shelf.

2. The logistics system of claim 1, where the tabs of the at least one shelf are configured to be installed into receptive individual slots in an operational configuration of the logistics system and into receptive stacking slots in a return configuration of the logistics system.

3. The logistics system of claim 1, wherein the tabs comprise a proximal portion that extends away from the respective longitudinal side of the frame, and a distal portion, that which extends from the proximal portion along the respective longitudinal side of the frame.

4. The logistics system of claim 1, where the tip of each tab includes a claw.

5. The logistics system of claim 1, wherein the logistics system comprises a plurality of such shelves.

6. The logistics system of claim 5, wherein the plurality of such shelves are loaded in a stacked configuration into at least one stacking slot in a return configuration of the logistics system.

7. The logistics system of claim 1, wherein the supports each comprise at least one elongated stacking slot configured to receive a plurality of tabs of a respective plurality of shelves in a stacked configuration.

8. The logistics system of claim 1, wherein the base has a quadrilateral shape and comprises uprights provided to at least one of: (i) opposing lateral edges of the base; or (ii) the corners of the base.

9. The logistics system according to claim 8 wherein the folding mechanism is provided between the uprights and the supports.

10. The logistics system of claim 1, where the folding mechanism comprises an elongated guide provided to the uprights and a hinge pin that is provided to the supports and configured to: (i) run in the guide of the upright; and allow respective translation and rotation between the support and base during conversion between the operational and folded state.

11. The logistics system of claim 1, where the roll container comprises casters provided on an underside of the base, the casters having a height, and where the uprights extend from the topside of the base at a height equal to or greater than the height of the casters.

12. The logistics system of claim 1, where:
the base comprises carrier beams extending along lateral sides of and elevated from the topside of the base;
the supports comprise cooperating counterpart beams configured to rest against the carrier beams of the base in the operational state of the roll container, and wherein
at least one said carrier beam comprises at least one strut configured to extend therefrom and engage with a said counterpart beam for maintaining the orientation of the support in the operational state.

13. The logistics system of claim 1, wherein the individual slots are each configured to accept only one tab at a time.

14. The logistics system of claim 1, wherein the plurality of individual slots comprises at least two types of slots arranged alternately along the support, wherein the at least two types have a different shape in respect to one another for helping the user choose the correct height for the shelf.

15. The logistics system of claim 1, wherein the individual slots and the at least one stacking slot are provided on opposing sides of the roll container.

16. A roll container comprising:
a base having carrier beams extending along lateral sides of and elevated from the topside of the base;
two elongated supports supported by the base, the supports comprising cooperating counterpart beams configured to rest against the carrier beams of the base in an operational state of the roll container;
a folding mechanism between the base and the supports for turning the supports between an operational state in which the supports extend transversally in respect to the base, and a folded state, in which the supports extend parallel to the base; wherein
each one of the two elongated supports comprises a plurality of individual slots provided in a spaced apart configuration along the supports, wherein each one of the plurality of individual slots is configured to receive a tab of a shelf of a respective plurality of shelves in a spaced apart configuration; and wherein at least one carrier beam comprises at least one strut configured to extend from the beam carrier and engage with the counterpart beam for maintaining the orientation of the support in the operational state.

17. The roll container of claim 16 wherein at least one of the plurality of shelves comprises:
   a quadrilateral frame;
   a pair of short tabs provided to two opposing corners of the frame, wherein the short tabs exhibit a kinked shape and a length along respective longitudinal sides of the frame; and
   a pair of long tabs provided to two opposing corners of the frame that oppose the pair of short tabs and that extend in the same direction as the pair of short tabs, wherein the long tabs exhibit a kinked shape and a length along respective longitudinal sides of the frame that is greater than the length of the short tabs.

18. The logistics system of claim 16, where the tabs of the at least one shelf are configured to be installed into receptive individual slots in an operational configuration of the logistics system and into receptive stacking slots in a return configuration of the logistics system.

19. The logistics system of claim 16, wherein the tabs comprise a proximal portion that extends away from the respective longitudinal side of the frame, and a distal portion, that which extends from the proximal portion along the respective longitudinal side of the frame.

20. The logistics system of claim 16, where the tip of each tab includes a claw.

* * * * *